Feb. 9, 1971  G. ORTEL  3,562,069
MACHINE FOR THE DIRECT JOINING OF VENEERS OR SIMILAR MATERIAL
Filed Feb. 19, 1968  3 Sheets-Sheet 1

Inventor:
GERHARD ORTEL
By
Lowry, Rinehart & Markus
ATTYS.

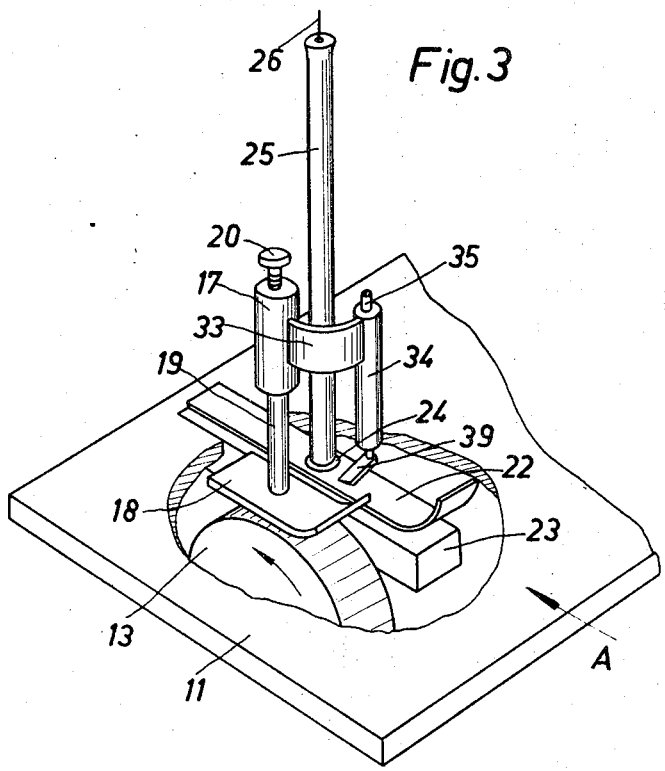
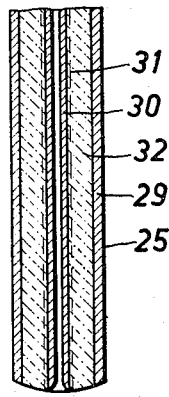

United States Patent Office 3,562,069
Patented Feb. 9, 1971

3,562,069
MACHINE FOR THE DIRECT JOINING OF
VENEERS OR SIMILAR MATERIAL
Gerhard Ortel, 10 Torfweg, Rietberg,
Westphalia, Germany
Filed Feb. 19, 1968, Ser. No. 706,382
Claims priority, application Germany, Feb. 27, 1967,
K 61,540
Int. Cl. B32b 31/04
U.S. Cl. 156—546                17 Claims

ABSTRACT OF THE DISCLOSURE

The invention provides a machine for joining grained thin sheet material, particularly individual veneers or sheets of veneers edgewise along the run of grain. For this purpose cross ties in the form of threads are adhesively affixed to the sheet material crosswise of the joints and grain. Furthermore, feed means are provided for continuously feeding the veneers on a worktable crosswise of the joints and grain underneath supply means for running a preheated thread coated with an adhesive under pressure onto the surface of the feeding veneers. Braking means are arranged to retard the forward feed of the veneers and close open joints and splits in the grain while the threads are being applied and the adhesive sets.

BACKGROUND OF THE INVENTION

This invention relates to a machine for providing a grained thin sheet material, patricularly individual veneers or sheets of veneers joined edgewise along the run of the grain, with cross ties in the form of threads adhesively affixed to the sheet material crosswise of the joints and/or the grain.

Sheets of veneer consisting of individual strips of veneer joined edgewise along the run of the grain are extremely vulnerable to damage, particularly near the edges, by cracking, splitting and so forth when they are being processed. Moreover, in large composite sheets of veneer (panels) the joints may also locally pull apart. This kind of damage can be prevented by additionally providing the veneers with cross ties that run across the grain and the joints.

Conventional veneer joining and cross gluing machines are not suitable for performing this work, since they lack means for pushing existing splits in the grain and open joints in the sheet together again when the cross ties are being provided.

Moreover, such machines are of the continuous type and the feed motion during the process of gluing tends to dislocate, distort and damage the treated veneer.

SUMMARY OF THE INVENTION

It is therefore the object of the present invention to provide a machine for securing veneers and sheets of veneer across the joints and the grain in a convenient as well as effective manner. Another object of the invention is to provide a machine of the aforesaid kind which is of simple design, reliable in operation and economical to use and control.

For achieving these objects the present invention proposes a machine for providing a grained thin sheet material, particularly individual veneers or sheets of veneers joined edgewise along the run of the grain, with cross ties in the form of threads adhesively affixed to sheet material crosswise of the joints and/or grain, which comprises feed means for continuously feeding the veneers on a worktable crosswise of the joints and/or grain underneath a supply means for running a preheated thread coated with an adhesive under pressure onto the surface of the feeding veneers, and braking means shaped like a band or rail which seek to retard the forward feed of the veneers and which operate to close open joints and splits in the grain whilst the thread is being applied and the adhesive sets.

In a preferred embodiment of such a machine the braking means consist of a downholder provided above the top of the worktable for pressing the feeding veneers against a plate let into the top of the worktable. Conveniently the plate may be an electromagnet in the form of a flat bar adapted to pull the downholder onto the surface of the travelling veneers by magnetic attraction.

The pressure of the downholder can be easily controlled by varying the power of the electromagnet. The downholder itself may have the form of a flat steel or like slipper with an upturned nose, movably suspended from an elevationally adjustable presser foot above the feed means for the veneers.

Moreover, in a preferred form of construction the feed means for the veneers may comprise a feed roller so mounted under the table that its peripheral surface slightly projects through an opening in the top of the table, and above said projecting part of the feed roller periphery a presser foot with an upturned nose adapted to press the veneer downwards onto the projecting peripheral surface of the rotating roller.

The peripheral surface of the feed roller may conveniently be provided with a layer of material, such as rubber, for increasing the friction between the roller and the underside of the veneers. The presser foot may preferably form a frictional drive with the feed roller for the travelling veneers.

Furthermore, in a preferred embodiment of the proposed machine the supply means for running the thread coated with an adhesive onto the travelling veneers may comprise an elevationally adjustable thread guide associated with heating means and adapted to be raised and lowered to bear on the surface of the travelling veneers through an opening in the downholder. The bottom end of the thread guide may be convexly domed.

More particularly, the thread guide and heating means may comprise an outer supporting tube and an inner heatable tube, preferably consisting of quartz or the like, for guiding the thread, the inner heatable tube being surrounded by an electrical heating element, such as a coil of resistance wire. An insulating composition for insulating and locating the heating element may be interposed between the inner wall of the outer tube and the outer wall of the inner tube.

Furthermore, it is preferred to provide cutter means controllably operable by an actuator, such as a solenoid and a plunger, through a linkage which simultaneously lifts the thread guide assembly out of the path of the cutter means when this is operated to cut off the end of the thread.

The thread guide and heating means, the downholder, the cutter means and the presser foot may all be attached to a slide adjustably movable in the direction of the grain and edge joints of the veneers.

Moreover, in a useful modification of the proposed machine the described worktable may be associated with a plurality of parallel additional tables placed side by side and slidably mounted on guide bars for adjustably varying their relative spacing, each table being provided with a feed roller and all the feed rollers being driven in synchronism. Each of the additional tables may be associated with a slide carrying a similar set of components as the slide associated with the first table.

The proposed machine is of simple design but effective in operation. By virtue of the action of the braking means comprising the downholder and electromagnetic plate, the feeding veneers experience resistance which generates a thrust across the joints and the grain and operates to close open joints and splits in the grain whilst the thread runs onto the veneers and is bonded thereto by the setting of the adhesive.

The machine is economical to use and performs the work of binding the veneers crosswise of the grain in a fully satisfactory manner. Moreover, the machine can be easily extended by the addition of further tables and corresponding working accessories to provide a machine of any desired capacity.

BRIEF DESCRIPTION OF THE DRAWINGS

An embodiment of the invention will now be described by way of example and with reference to the accompanying drawings, in which:

FIG. 3 is a perspective view of the thread guide and heating means, the braking means and the friction drive, and FIG. 4 is an axial section on a larger scale of the bottom end of the thread guide and heating means.

DESCRIPTION OF THE PREFERRED EMBODIMENT

Figure 1:
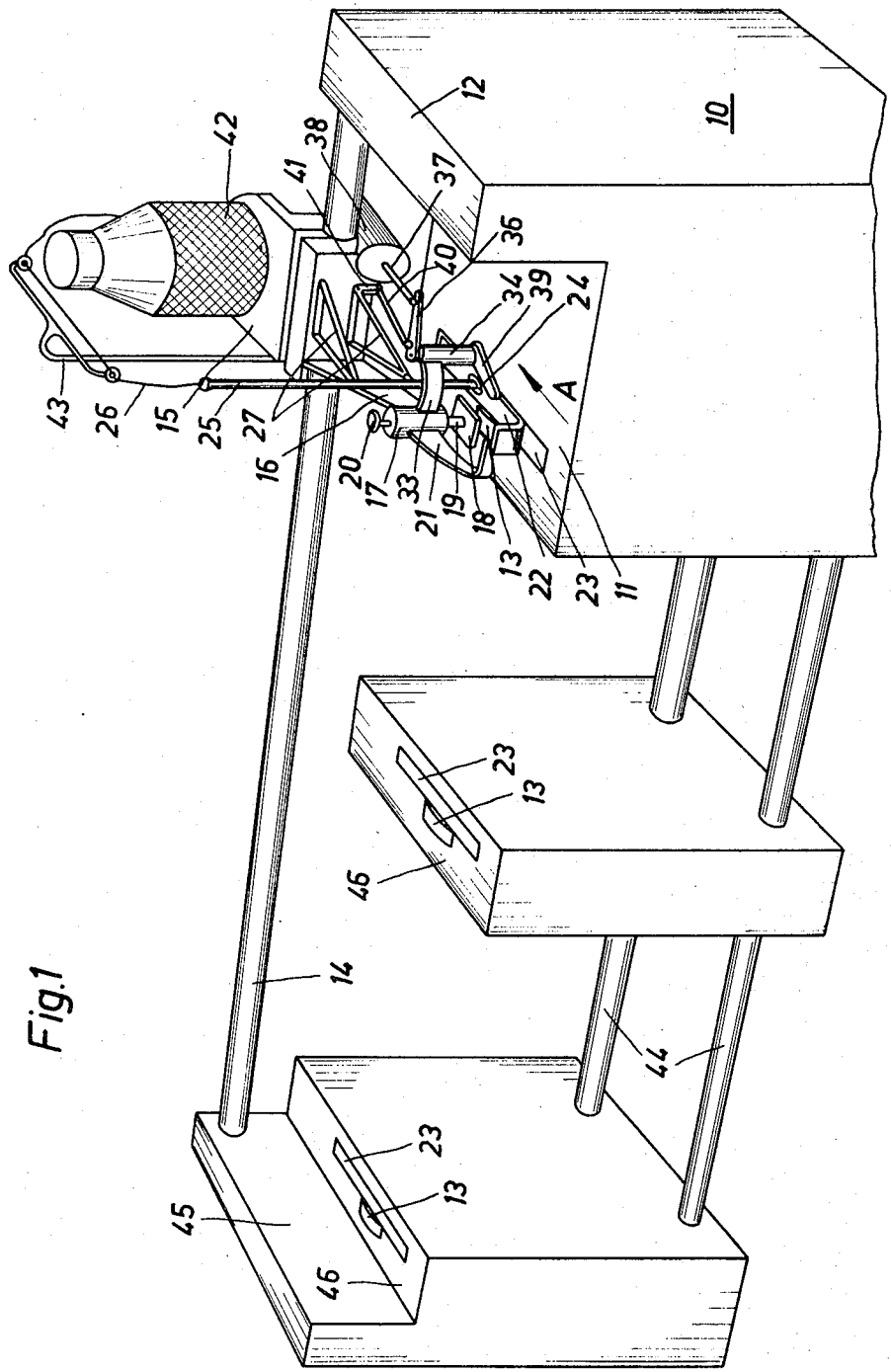
FIG. 1 is a perspective view of a machine for providing veneers and sheets of veneers with ties across the joints and the grain. The drawing illustratively and schematically shows the general disposition of the movable thread guide and heating means, the braking means and the friction feed for the veneers. The illustrated machine also comprises additional tables which are merely generally indicated without the working accessories.

The illustrated machine for providing a grained thin sheet material, particularly veneers or the like, with cross ties comprises a main frame 10 which forms a horizontal worktable 11 and a pedestal 12 rising along one side of the table 11.

A power-driven feed roller 13 is rotatably so mounted under the table 11 that a small portion of the revolving peripheral surface which is provided with a layer, particularly of rubber or the like, for increasing its frictional properties, slightly projects from an opening cut into the top of the table 11. One end of a horizontal guide bar 14 which extends across the direction of feed of the roller 13, and which carries a slide 15 adjustably movable along the length of the bar, is fitted into the rear side face of the pedestal 12.

Secured to that side of the slide 15 which faces away from the pedestal 12 is a bracket 16 which near its end carries a bearing block 17. This bearing block 17 extends vertically above the culminating point of the projecting periphery of the feed roller 13 coaxially with the vertical center axis of the roller and carries a presser foot 18. The presser foot may have the general form of a rectangular plate with an upturned nose (i.e. the end facing the direction of feed). The presser foot 18 is attached to the bottom end of a stem 19 which is elevationally adjustable in the bearing block 17 and adapted to be secured in any desired position of adjustment in relation to the feed roller 13 by means of a milled nut 20 at the top of the bearing block, thereby to vary and control the frictional effect of the feed roller. The side of the bearing block facing the direction of feed A of the veneers carries an arm 21 of which the end curves towards the center of the table where it supports a movable downholder 22. The latter may preferably consist of a length of steel band or the like, likewise having an upturned nose movably suspended from the curved end of said arm. Let into the table top 11 below the downholder 22 offset from and parallel to the plane of the feed roller 13, is an electromagnetic bar 23 which serves as an abutment and cooperates with the downholder 22. The downholder 22 and the bar 23 together form an elongated press-down and braking device which operates to close open grain and to urge the joints of the travelling veneers tightly together.

Figure 2:
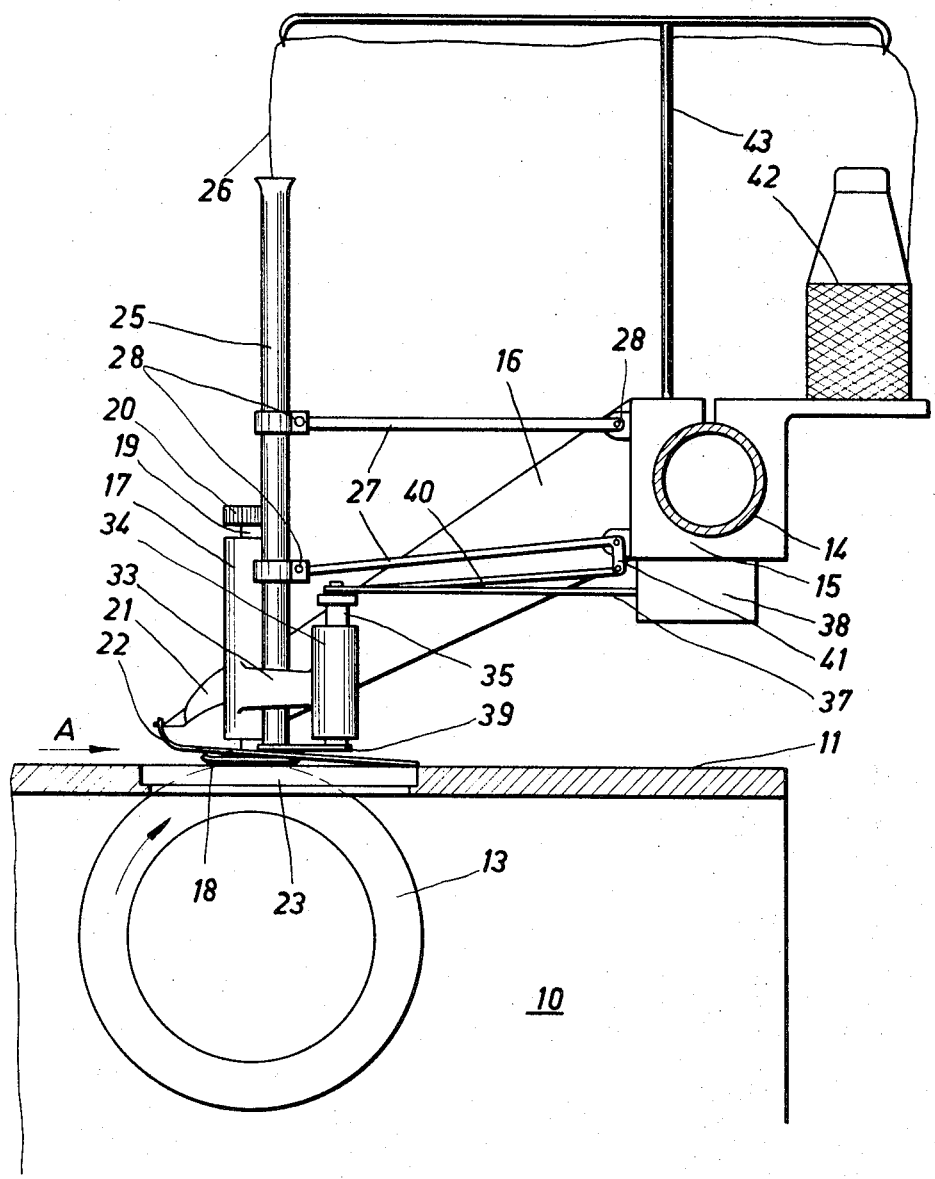
FIG. 2 is a part sectional side elevation of one worktable and one working head of the machine according to FIG. 1.

An opening 24 is cut into the center region of the downholder 22 through which the bottom end of a vertically disposed thread guide and heater 25 for feeding a thread 26 to the veneers that are to be connected together can bear down on the veneer surface. The thread guide and heater 25 is attached to the slide 15 by means of two parallel arms at different elevational levels, each in the form of a triangular frame 27. The ends of the frames 27 are hingeably attached to the thread guide and heater 25 as well as to the slide 15 at the points marked 28 in FIG. 2.

The thread guide and heater 25 comprises an outer supporting tube 29 containing coaxially in its interior a guide and heating tube 30, preferably consisting of quartz, quartz glass or the like. The guide and heating tube 30 is surrounded by an electrical heating coil 31 made of a round or flat section wire or the like and the guide and heating tube 30 as well as the wire are embedded in an insulating composition 32 which holds the assembly in position and at the same time insulates the heating coil 31 from the outer supporting tube 29.

The bottom end of the thread guide and heater 25 which contains the outlet opening for the connecting thread 26 is convexly domed. At the same time the end of the guide and heating tube 30 is flared and rounded to prevent the issuing connecting thread 26 from being damaged (cf. FIG. 4). This form of construction of the bottom end of the thread guide and heater 25 provides a satisfactory degree of freedom to the connecting thread 26 during the process of pressing and gluing the same to the surface of the veneers.

Finally the bearing block 17 is provided with a further arm 33 which arches around the thread guide and heater 25, and which at its end carries a bearing 34 for a vertical hinge pin 35. Rigidly affixed to the upper projecting end of the hinge pin is a lever 36 and the free end of this lever is articulated to the end of a push rod 37 forming the extension of the plunger of a solenoid 38 or the like affixed to the underside of the slide 15. The bottom end of the hinge pin 35 which projects from under the bearing 34 carries cutter means, preferably in the form of a knife blade 39, which can be swung across the path of the connecting thread to sever the same when the push rod 37 is advanced and deflects the level 36 to rotate the hinge pin 35. The lever is linked to a second rod 40 which at its other end is pivotably attached to a bellcrank lever 41. Deflection of the lever 36, as described, therefore causes the thread guide and heater 25 to be raised by the bellcrank 41 and the triangular supporting frames 27 at the same time as the knife blade is induced to perform its cutting motion. The end of the thread guide and heater 25 will thus be withdrawn from the opening 24 in the downholder 22 at the time the blade 39 sweeps across this opening and cuts off the thread below the end of the thread guide and heater 25.

Mounted on the slide 15 is a supply package 42 of thread 26 from which the latter can be withdrawn through eyelets or the like attached to a stand 43, and fed into the upper end of the thread guide and heater 25. Preferably the connecting thread 26 should be a non-stretchable thread, consisting for instance of glass silk or the like, and provided with a coating of adhesive.

The above described machine functions as follows:

In the machine the several veneers which have been joined edgewise along the grain to form larger sized sheets are further secured across the grain to prevent splitting, cracks, splintering and opening of the joints along the grain. For this purpose the sheets are fed in the direction A crosswise of the grain into the above described machine. The veneers which lie flat on the table 11 are driven across the table to the gluing device by the rubber-faced feed roller 13, the friction engendered by the roller under the downward pressure of the presser foot 18 being sufficient to feed the sheet of veneer forward, the downward thrust of the presser foot 18 being adjustable and pressing the veneer against the rotating peripheral rubbing surface of the feed roller 13 which applies a sliding movement. During their forward feed in the direction A the veneers are simultaneously subjected to pressure due to the activated electromagnetic bar 23 pulling the downholder 22 downwards onto the surface of the moving veneers. This pressure of the downholder 22 has a braking effect which tends to reduce the speed of the feeding veneers and causes any existing cracks or splits in the grain as well as the edge joints between the veneers to be pushed tightly together. In other words, open gaps in the grain and between abutting edges of the veneers are reclosed by the action of the downholder 22 in cooperation with the presser foot 18, the braking effect retarding that part of a veneer which precedes a crack and permitting the following part of the veneer to gain on the retarded portion and thereby to reclose the crack.

The thread guide and heater 25 projects through the opening 24 in the downholder 22 and its convex end rides on the surface of the travelling veneers. While connecting thread 26 runs down the heated center tube 30 of the thread guide and heater 25, its adhesive coating is softened and the thread is then applied with pressure by the convex end face of the thread guide and heater 25 to the surface of the veneers to which it remains firmly attached by the setting adhesive. The thread is continuously drawn down the thread guide and heater 25 and is applied to the veneers across the grain and the joints.

When the sheet has run through the machine and the application of the glued thread has been completed, the cutter means are operated by the solenoid 38 which advances the push rod 37 and deflects the lever 36. This lever 36 simultaneously operates the rod 40 and bellcrank 41 to swing the carrier frames 27 upwards and thereby to lift the thread guide and heater 25 sufficiently to clear the opening 24 in the downholder 22 and to provide a passage below the thread guide and heater 25 for the knife blade 39 to swing about its hinge 35 across the opening into the gluing position of the veneers and to cut the end of the thread. The knife blade 39 then returns into its normal position while the thread guide and heater 25 is relowered in readiness for another sheet of veneer to be fed into the machine and to be provided with a cross grain connection.

The size of the worktable 11 is sufficiently large to permit say sheets of facing veneer for cupboards and wardrobes or the like of normal size to be fed at least half way through the machine and provided with cross ties. The sheets can then be reversed and the other half secured across the grain by connecting thread at desired intervals as many times as may be desired. Valuable veneers can thus be safeguarded and prevented from splitting during the process of pressing.

In order to facilitate economical gluing of sheets of veneers simultaneously on both sides the above described machine (cf. FIG. 1) may be provided with several tables 46 working in parallel, each containing a feed roller 13 and an electromagnetic bar 23. The feed rollers 13 may be synchronously driven by one motor through a common main drive shaft. The several tables 11 which are placed side by side may be slidably mounted in relation to the main frame 10 of the machine on two parallel slide bars 44 or ways. By appropriate adjustment of the spacing of the tables several connecting threads can be run on the veneers simultaneously at selectable intervals. The end of the upper bar 14 is supported in a pedestal 45 on the side of the last table of the assembly. This bar 14 carries a slide 15 (not shown) carrying thread guide and heater 25, downholder 22 and a cutter 39 in respect of each table.

For veneers required for less important purposes, which need not be cross connected over their entire length, accessory devices may be provided in the above described machine. The proposed machine for securing veneers across the grain is characterized by a construction which combines extreme simplicity with the greatest reliability and convenience. Open grain and splits in veneers passed through the machine are reclosed and reliably secured by the downholder braking action.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A machine for providing a grained thin sheet material, particularly individual veneers or sheets of veneers joined edgewise along the run of the grain, with cross ties in the form of threads adhesively affixed to the sheet material crosswise of the joints and grain, comprising a worktable, feed means for continuously feeding the veneers on the worktable crosswise of the joints and grain, supply means for running a preheated thread coated with an adhesive under pressure onto the surface of the veneers, and braking means to retard the feed of the veneers and to close open joints and splits in the grain while the thread is being applied and the adhesive sets said braking means comprising a magnetically responsive downholder above the worktable for pressing the veneers downwardly and an electromagnetic abutment plate in the top surface of the worktable.

2. A machine according to claim 1, wherein the power of the electromagnet is adjustable to control the downward pressure of the downholder on the travelling veneers.

3. A machine according to claim 1, wherein the downholder has the form of a flat steel slipper.

4. A machine according to claim 1, wherein the downholder is movably suspended from an elevationally adjustable presser foot above the feed means for the veneers.

5. A machine according to claim 1, wherein the feed means for the veneers comprise a feed roller so mounted under the worktable that its peripheral surface slightly projects through an opening in the top of the worktable, and above said projecting part of the feed roller a presser foot with an upturned nose adapted to press the veneer downwards onto the projecting peripheral surface of the feed roller.

6. A machine according to claim 5, wherein the peripheral surface of the feed roller is provided with a layer, preferably of rubber, for increasing its friction.

7. A machine according to claim 1, wherein said supply means for running a thread coated with an adhesive onto the feeding veneers is an elevationally adjustable thread guide and heater adapted to be lowered to bear on the surface of the feeding veneers through an opening in the downholder.

8. A machine according to claim 7, wherein the bottom end of the thread guide and heater is convexly domed for contact with the surface of the feeding veneers.

9. A machine according to claim 7, wherein the thread guide and heater comprises an outer supporting tube and an inner heatable tube, for guiding the thread.

10. A machine according to claim 9, wherein the inner heatable tube is surrounded by an electrical heating coil.

11. A machine according to claim 9, wherein the inner heatable tube is surrounded by an electrical heating coil and an insulating composition is provided between the inner wall of the outer supporting tube and the outer wall of the inner heatable tube in which insulating composition said electrical heating coil is embedded.

12. A machine according to claim 7, comprising cutter means, preferably in the form of a deflectably mounted knife blade, adjacent the bottom end of the supply means for the thread.

13. A machine according to claim 12, wherein the cutter means is controllably operable by an actuator through a linkage which simultaneously lifts the supply means for the thread out of the path of the cutter means.

14. A machine according to claim 12, wherein the downholder is movably suspended from an elevationally adjustable presser foot and the thread guide and heater, the downholder, the cutter means and said presser foot are all attached to a slide adjustably movable in the direction of the grain and edge joints of the veneers.

15. A machine for providing a grained thin sheet material, particularly individual veneers or sheets of veneers joined edgewise along the run of the grain, with cross ties in the form of threads adhesively affixed to the sheet material crosswise of the joints and grain, comprising a worktable, a plurality of parallel additional tables placed side-by-side, synchronously driven feed rollers in the worktable and each of the additional tables for continuously feeding the veneers on the worktable and additional tables crosswise of the joints and grain, supply means for running a preheated thread coated with an adhesive under pressure onto the surface of the veneers, and braking means to retard the feed of the veneers and to close open joints and splits in the grain while the thread is being applied and the adhesive sets.

16. A machine according to claim 15, wherein said additional tables are slidably mounted in relation to the worktable on ways for adjustably varying their relative spacing.

17. A machine according to claim 15, wherein said additional tables are each associated with a slide carrying similar sets of components as the slide associated with the first worktable.

References Cited
UNITED STATES PATENTS

| | | | |
|---|---|---|---|
| 1,303,687 | 5/1919 | Leffler | 156—304X |
| 2,739,628 | 3/1956 | Kok | 156—304X |
| 2,928,455 | 3/1960 | Albrecht et al. | 156—522X |
| 2,974,566 | 3/1961 | Hurley | 156—304X |
| 3,138,511 | 6/1964 | Cadwallader | 156—500X |
| 3,326,736 | 6/1967 | Ortel | 156—304X |

SAMUEL W. ENGLE, Primary Examiner

U.S. Cl. X.R.

144—281; 156—304